United States Patent [19]
Kuntz

[11] 3,926,925

[45] Dec. 16, 1975

[54] NOVEL POLYMERS OF OLEFINS AND POLAR MONOMERS

[75] Inventor: Irving Kuntz, Linden, N.J.

[73] Assignee: Exxon Research & Engineering Co., Linden, N.J.

[22] Filed: July 27, 1973

[21] Appl. No.: 383,093

[52] U.S. Cl. ... 260/78.5 R; 260/78 UA; 260/78.5 E; 260/78.5 HC
[51] Int. Cl.$^2$ C08F 4/14; C08F 220/14; C08F 220/18
[58] Field of Search ..... 260/78.5 R, 78.5 T, 78.5 H, 260/78.5 C, 78.5 E, 78 UA, 80.81

[56] References Cited
UNITED STATES PATENTS

| | | | |
|---|---|---|---|
| 3,471,460 | 10/1969 | Rees | 260/88.1 |
| 3,474,076 | 10/1969 | Dalibor et al. | 260/78.5 |
| 3,507,787 | 4/1970 | Pratt et al. | 210/54 |
| 3,637,611 | 1/1972 | Takeya et al. | 260/78.5 N |
| 3,717,613 | 2/1973 | Ichikawa et al. | 260/63 |
| 3,752,788 | 8/1973 | Hirooka et al. | 260/47 |
| 3,799,911 | 3/1974 | Dissen et al. | 260/78.5 R |

*Primary Examiner*—John Kight, III

[57] ABSTRACT

Novel interpolymers containing an olefin, a polar monomer, such as an alkyl acrylate, and from 0.05 to 35 mole % of a fumarate ester or a maleic acid derivative. The introduction of the last component leads to altered viscosity properties, and enables the interpolymers to be cured with diamine compounds. The polymers are prepared with a catalyst system of an alkyl aluminum halide and an organic peroxide.

8 Claims, No Drawings

NOVEL POLYMERS OF OLEFINS AND POLAR MONOMERS

BACKGROUND OF THE INVENTION

The present invention relates to novel interpolymers of olefins and alkyl acrylates with a third monomer comprising either a fumarate ester or amide or a maleic acid derivative.

PRIOR ART

There are many descriptions in the prior art of the preparation of olefin-acrylate polymers. Early work was directed to polymers of acrylate and higher olefins for use as oil additives.

In recent years work has been reported directed to alternating copolymers of olefins with acrylic acid esters. In U.S. Pat. No. 3,637,611 there is a disclosure that certain multi-substituted conjugated vinyl groups are polymerizable as the polar monomer in such alternating polymer systems. However, the patentees state that the multi-substituted conjugated vinyl monomer is not polymerizable unless the unsaturated bonds of one of the polar groups is in the conjugated position with reference to the vinyl group, and the remaining polar groups are attached over an interposing specific alkylene group (e.g., methylene or ethylene group) to the carbon atom bearing a double bond.

Thus, excepted from the monomers taught therein are fumaric acid derivatives and maleic acid derivatives. Included in this exception would be maleic anhydride and citraconic anhydride (methylmaleic anhydride). It has now been discovered that this problem can be overcome by the following methods for polymerization, resulting in the novel interpolymers described hereinbelow.

SUMMARY OF THE INVENTION

This invention describes a novel composition of matter comprising an interpolymer of from 20 to 60 mole % of an olefin of from 2 to 24 carbon atoms, from 80 to 40 mole % of an acrylic acid ester where the ester moiety has from 1 to 20 carbon atoms, and from 0.05 to 35 mole % of a monomer selected from the group consisting of (a) mono- and diesters of fumaric acid, (b) mono- and di- amides of fumaric acid, (c) derivatives of maleic acid selected from the group consisting of esters, amides, imides and the anhydride, (d) $C_1$–$C_8$ alkyl substituted maleic acid derivatives selected from the group consisting of esters, amides, imides and the anhydride, the interpolymer having an inherent viscosity greater than 0.3 when measured in benzene at 25°C.

Typical interpolymers of the invention comprise isobutylene, ethyl acrylate with from preferably 0.1 to 25 mole % maleic anhydride.

The interpolymers of the invention are prepared by contacting the monomers with a catalyst selected from the group consisting of (a) alkylaluminum halide, (b) alkylboron halide, or (c) mixtures of trialkyl aluminum and a metal halide, where the metal is selected from aluminum, tin, zinc and boron. The use of an organic peroxide is often employed the enhance polymerization rate in forming the interpolymers of the invention.

DESCRIPTION OF PREFERRED EMBODIMENTS

The detailed microstructure of the interpolymers of this invention may be of several types. The particular structure depends on the exact polymerization conditions, particularly the ratio of the acrylate monomer to the organometal compound and the ratios of acrylate monomer, olefin and fumarate or maleate reactants. For example, when the ratio of the acrylate monomer to the organometal compound is large, greater than 300, for example, interpolymers containing higher levels of the acrylate monomer are obtained, for example 60 to 80 mole %. The olefin and fumarate and/or maleate derivatives are then distributed among the contiguous acrylate monomer residues. When the ratio of the acrylate monomer to the organometal compound is smaller, less than 100, for example, the amount of acrylate and olefin residues in the interpolymer tend to be more nearly equal, with a proclivity for alternation of the acrylate and olefin residues, with the fumarate or maleate derivative residues distributed along the macromolecule. In all cases it is believed that the residues from the fumarate or maleate derivatives tend to occur as isolated residues, although in interpolymers containing higher levels of these materials there is the possibility of adjacent residues of these reagents to a limited extent.

It is thus seen that the detailed structure of the interpolymers of this invention may vary depending on the particular polymerization conditions. This variety of structures form part of this discovery.

The interpolymers of this invention are derived from various classes of components. The first class is olefin monomers which may be an alpha-olefin, a 2-alkyl-1-olefin, or a vinyl aromatic. Suitable monomers of this type are ethylene, propylene, butene-1, isobutylene, heptene-1, 2-methyl-octadecene-1, 2-methyl-butene-1, 2-methylpentene-1, styrene, alpha-methyl styrene, 4-chlorostyrene, and other olefin monomers of this type. Included in this class are monomers such as vinyl ethers, such as, methyl vinyl ether, ethyl vinyl ether, 2-chloroethyl vinyl ether, 2-alkoxyethyl vinyl ether, and the like. More than one monomer of this class may be used to prepare the interpolymers of this invention, that is, mixtures of monomers may be used. Preferred olefin monomers are propylene and isobutylene. The olefin or vinyl component comprises about 20 to 60 mole % of the interpolymer. Preferably, it comprises about 25 to 50 mole % of the interpolymer.

The second class of monomer of the interpolymer is (a) a fumaric acid ester or amide, (b) a maleic acid derivative, or (c) an alkyl substituted derivative of maleic acid, the alkyl having from 1 to 8 carbon atoms. Specifically, the most suitable members of this group are fumarate esters, maleate esters, maleic anhydride and methyl maleic anhydride (known as citraconic anhydride). Other substituted derivatives of these monomers are also useful in the present invention.

These second monomers comprise only up to about 35 mole % of the interpolymer. Preferably, they range from 0.05 to 30 mole %, more preferably from 0.1 to 25 mole % of the total polymer.

The third class of monomer is a polar monomer, such as an acrylic acid ester. These monomers are characterized as forming complexes with the Lewis acid component of the catalyst system useful in the invention.

Typical monomers of this type are alkyl acrylates, alkyl methacrylates and methacrylonitrile. Also suitable are methyl vinyl ketone and acrolein. The alkyl group can have 1 to 25 carbon atoms, and may be olefinic or substituted by halogen. Suitable are methyl acrylate, ethyl acrylate, 2-ethylhexyl acrylate, 2-chloroethyl acrylate, 2-butenyl acrylate, lauryl acrylate, and the like. Preferably, the polar monomer is ethyl acrylate.

The total polar moiety generally comprises 40 to 80 mole % of the total polymer, with the other components making up the remainder.

The catalyst systems useful in the invention may be chosen from (a) alkylaluminum halides, (b) alkylboron halides, (c) mixtures of a trialkylaluminum and a metal halide.

The alkylaluminum halide has the formula $R_nAlX_{3-n'}$ where R is an alkyl group having from 1 to 10 carbon atoms, n is a number between 1 and 2, and X is a halogen, preferably chlorine. Typical alkylaluminum halides are alkylaluminum dihalides, dialkylaluminum halides, and alkylaluminum sesquihalides. The preferred catalysts are ethylaluminum dihalide and ethylaluminum sesquihalide.

The alkylboron halides have the generic formula $R_nBX_{3-n}$, where R is an alkyl group having from 1 to 10 carbon atoms and n is 1 to 2, and X is a halogen, preferably chlorine. Typical alkylboron halides are alkylboron dihalides and dialkylboron halides. The preferred member of this group is ethylboron dichloride.

The trialkylaluminum-metal halide catalyst system involves a mixture of a trialkylaluminum $R_3Al$, where R is an alkyl group with from 1 to 10 carbon atoms with a metal halide $MX_n$ where M is chosen from the group aluminum, tin, zinc or boron, X is halogen and n is the valence of the particular metal of the halide employed. Particularly preferred as the metal halides are zinc chloride, aluminum chloride, boron trifluoride and tin tetrachloride. The molar ratio of the trialkylaluminum to the metal halide is 0.25 to 2.0.

Most preferred of the various catalyst systems are alkylaluminum dihalides and alkylaluminum sesquihalides, particularly the chlorides.

The amount of the catalyst system used may be expressed in terms of the molar ratio of the polar monomer to the organometallic catalyst ingredient. This ratio may vary from 1 to 1000, preferably from 1 to 800, and more preferably from 1 600.

If desired, a vanadium compound may be used in conjunction with the previous described catalyst systems. The vanadium compound is chosen from the group vanadium halides, vanadium oxyhalides, vanadyl compounds and vanadium beta-diketonates. Preferred vanadium compounds are vanadium tetrachloride, vanadyl chloride, di- and trialkyl vanadates, and vanadium acetylacetonate. The molar ratio of the organometallic compound of the catalyst system to the vanadium compound, if it is employed, is in the ratio of 0.05 to 10.

Used in conjunction with the catalyst system components are organic peroxides. The organic peroxides used in the present invention are organic compounds having a peroxide linkage, such as diacyl peroxides, ketone peroxides, ether peroxides, esters of peracids and the like. Suitable examples of these compounds are benzoyl peroxide, lauroyl peroxide, acetyl peroxide, 2-methylpentanoyl peroxide, dialkylperoxydicarbonates, t-butyl peroxypivalate, methyl ethyl ketone peroxide, t-butyl hydroperoxide, dicumyl peroxide, and the like. The use of peroxides in the preparation of the interpolymers of this invention tends to accelerate the rate of reaction.

The polymers of this invention are prepared in slurry or solution. Suitable solvents include aliphatic and aromatic hydrocarbons and their halogenated derivatives. Preferred solvents are propane, pentane, hexane, cyclohexane, toluene, benzene, branched paraffins known commercially as Isopars, methyl chloride, ethyl chloride, ethylene chloride, chlorobenzene and the like. Mixtures of solvents may be employed.

Polymerizations may be carried out by batch or continuous processes, at temperatures ranging from about $-100°$ to about $+100°C$. A preferred temperature range would be from about $-50°$ to $+50°C$.

The reaction is conducted in an inert atmosphere, at a pressure of from 1 to 100 atmospheres, sufficient to maintain a significant fraction of the reactants in the liquid phase. A preferred pressure range would be about 1 to 30 atmospheres.

In the polymerization the molar ratio of the olefin to polar monomer is kept at 1 or higher, preferably from 1 to 10, if interpolymers containing lower amounts of the polar monomer are desired. If products with higher levels of polar monomer are desired, the olefin/polar monomer ratio is kept below 1, perhaps as low as 0.3 to 0.5.

After a suitable reaction time, which depends on the particular proportions of reactants, the reaction is terminated by the addition of a reagent such as alcohol, and the product deashed, and isolated by conventional techniques such as precipitation in a non-solvent, or steam stripping, isolated and dried.

It has been found that the incorporation of the Class 2 components imparts novel and useful properties compared to the polymers made from Class 1 and 3 components. These novel and useful properties include the feature of new crosslinking reactions unavailable to the Class 1 and 3 copolymers. Also, the new interpolymers of this invention have significantly different bulk viscosity properties. They show less cold flow and tack than the conventional materials, although measurements show that the glass transition temperature of the new materials is the same as the products made with only the Class 1 and 3 materials. This behavior may be due to the functional groups of the new materials which have ionic groups which lead to coulombic interactions which result in pseudo-plastic behavior; to a degree they may exhibit the properties of crosslinked systems.

EXAMPLE 1

An interpolymer was prepared comprising ethyl acrylate, isobutylene, and a minor amount of maleic anhydride. In a pressure bottle were placed 200 ml. of toluene, 0.5 mole of ethyl acrylate, 1.0 mole of isobutylene, and 0.1 mole of maleic anhydride. The ethyl acrylate and 4.4 millimoles of ethyl aluminum sesquichloride were first placed in the bottle, then the remaining monomers, along with 1 millimole of lauroyl peroxide. The bottle was then sealed. After 150 hours at 32°C. the reaction was terminated by the addition of a large volume of isopropyl alcohol and ethanol. The polymer product was dried in a vacuum oven at 40°-50°C., weighed 52 grams. The inherent viscosity in benzene at 20°C. was 1.0 dl/g and the inherent viscosity in acetone at 20°C. was 1.3 dl/g.

The polymer was analyzed and found to contain 64.04% carbon, 8.65% hydrogen. NMR analysis was carried out at 60 $MH_z$ on a 15 weight % solution in acetone $-d_6$. From the integrals of the multiplet at 4.2 ppm due to the $OCH_2$ group of ethyl acrylate, the singlet at 0.9 ppm due to the gem - dimethyl group of isobutylene and the broad multiplet between 3.0–3.7 ppm due to the methine hydrogens of maleic anhydride, the following mole percent composition was calculated for the terpolymer: ethylacrylate 49%, maleic anhydride 15%, isobutylene 36%.

EXAMPLE 2

Following the procedure of Example 1, an interpolymer was prepared by adding to the reactor:

| | |
|---|---|
| Toluene, ml | 200 |
| Maleic anhydride, mole | 0.05 |
| Ethyl acrylate, mole | 0.5 |
| Isobutylene, mole | 1.0 |
| 2-Chloroethyl vinyl ether, mole | 0.04 |

The catalyst used in preparing the polymer was 4.5 mmoles of ethyl aluminum sesquichloride and 1 mmole of lauroyl peroxide. The polymerization was conducted at 32°C. for 48 hours. The polymerization yielded 51 g of polymer having an inherent viscosity in acetone (20°C.) of 1.2.

Based on elemental and NMR analysis, the structure indicated the following estimate of the residues in the interpolymer: ethyl acrylate 42–51 mole %, isobutylene 33–42 mole %, 2-chlorovinyl ether 3–7 mole %, and maleic anhydride 9–12 mole %.

The curing of these polymers is illustrated in Examples 17 and 18.

EXAMPLE 3

In this example, I attempted to prepared a copolymer having 50 mole % maleic anhydride and 50 mole % isobutylene. Following the general procedure of Example 1, 200 ml. of toluene was placed in a pressure bottle, along with 0.5 mole maleic anhydride and 1.0 mole isobutylene. The toluene contained 4.4 millimoles of ethyl aluminum sesquichloride. To the mixture was added 1 mmole of lauroyl peroxide.

The bottle was then sealed. The contents were subjected to polymerization conditions for 150 hours at 32°C. After this time the reactants were quenched by adding a large volume of isopropyl alcohol and propanol. The product was dried and analyzed and found to contain 49.39% carbon and 5.22% hydrogen (calculated for $C_4H_2O_3$: C-48.99; H-2.06). The elemental analysis indicates that the product is derived solely from maleic anhydride and contains no significant amount of isobutylene.

EXAMPLES 4–7

A series of experiments were conducted to determine whether very small amounts of maleic anhydride would provide the olefin-acrylate polymers with the unusual properties discovered when higher levels of maleic anhydride were used. The polymerization procedure was that followed in Example 1, including polymer recovery and drying. The results, along with amounts of each monomer used, are shown in Table I.

TABLE I

| POLYMERIZATION WITH MALEIC ANHYDRIDE - ISOBUTYLENE - ETHYL ACRYLATE[a] | | | | |
|---|---|---|---|---|
| Example | 4 | 5 | 6 | 7 |
| Maleic anhydride, mole | 0.1 | 0.05 | 0.025 | 0.013 |
| Ethyl aluminum sesquichloride, mmole | 4.4 | 4.4 | 4.5 | 4.5 |
| Polymerization time, Hrs. | 150 | 150 | 48 | 48 |
| Yield, grams | 52 | 66 | 29 | 42 |
| Inherent Viscosity | | | | |
| Benzene, 20°C. dl/g | 1.0 | 1.5 | — | — |
| Acetone, 20°C. dl/g | 1.3 | 1.3 | 1.1 | 1.1 |
| Analysis, Carbon % | 64.04 | 67.41 | 64.91 | 65.82 |
| Hydrogen % | 8.65 | 9.73 | 9.21 | 9.68 |

[a]Employed 200 ml Toluene, 0.5 mole ethyl acrylate, 1.0 mole isobutylene, 1 mmole lauroyl peroxide; Polymerization temp. = 32°C.

One of the important features of the invention is illustrated in Example 4. It should be noted that the inherent viscosity of the product therein is higher than that found for the copolymer not containing the maleic anhydride. When isobutylene-ethyl acrylate copolymers are made under similar conditions to those in Example 4, the inherent viscosity of the copolymer is often in the 0.6 to 0.8 range, compared with the 1.3 value observed in Example 4.

The products of this invention exhibit high green strengths. At the same time, at higher temperatures, such as are used in conventional processing equipment, their viscosity is low and enables easy handling.

EXAMPLES 8–15

These were all prepared in the same manner as in Example 1. The proportions of each component and the results are illustrated in Table II.

The Table II data shows other interpolymerizations involving maleic anhydride. In Examples 8 and 9, there is a comparison between interpolymerizations of ethyl acrylate, isobutylene, and 2-chloroethyl vinyl ether, with and without, maleic anhydride being present. It should be noted that there is an improved yield of polymeric product in Example 9 compared to Example 8. This is another unexpected and useful aspect of the present invention. Note should also be made of the higher inherent viscosity of the products of the present invention compared to the usual material.

Examples 10 and 11 show this same pattern of behavior for the process of the present invention, using a lower concentration of maleic anhydride in the monomer feed.

Examples 14 and 15 are a particularly interesting embodiment of the present invention. The copolymer of isobutylene and butyl acrylate prepared in Example 13 is characterized by very high tack. In the embodiment of the invention, as illustrated in Example 15, incorporating maleic anhydride in the monomer feed, yields a product completely free of tack. It is possible to fabricate this product into powder or pellets for ease in handling, an extremely desirable feature in the handling of modern elastomeric products.

TABLE II

VARIOUS INTERPOLYMERIZATIONS WITH MALEIC ANHYDRIDE

| Example | 8 | 9 | 10 | 11 | 12 | 13 | 14 | 15 |
|---|---|---|---|---|---|---|---|---|
| Reference 2545- | 146-1 | 146-2 | 155-2 | 155-3 | 155-4 | 152-2 | 151-1 | 151-2 |
| Toluene, ml | 200 | 200 | 200 | 200 | 200 | 200 | 200 | 200 |
| Maleic anhydride, mole | 0.0 | 0.05 | 0.0 | .025 | .0125 | 0.1 | 0.0 | 0.1 |
| Ethyl acrylate, mole | 0.5 | 0.5 | 0.5 | 0.5 | 0.5 | 0.5 | — | — |
| Butyl acrylate, mole | — | — | — | — | — | — | 0.5 | 0.5 |
| 2-Chlorethyl vinyl ether, mole | 0.04 | 0.04 | 0.05 | 0.05 | 0.05 | — | — | — |
| α-Methyl styrene, mole | — | — | — | — | — | 0.5 | — | — |
| Isobutylene, mole | 1.0 | 1.0 | 1.0 | 1.0 | 1.0 | — | 1.0 | 1.0 |
| $AlEt_{1.5}Cl_{1.5}$, mmole | 4.5 | 4.5 | 4.5 | 4.5 | 4.5 | 4.5 | 4.5 | 4.5 |
| Lauroyl peroxide, mmole | 1 | 1 | 1 | 1 | 1 | 1 | 1 | 1 |
| Polymerization temp., °C | 32 | 32 | 32 | 32 | 32 | 32 | 32 | 32 |
| Polymerization time, hrs. | 48 | 48 | 42 | 42 | 42 | 42 | 42 | 42 |
| Yield polymer, g | 23 | 51 | 49 | 72 | 59 | 1.9 | 32 | 32 |
| Inherent Viscosity, Acetone, 20°C | 0.65 | 1.2 | 0.58 | 0.76 | 0.74 | 0.13 | 0.70 | 1.5 |
| Analysis, % Carbon | 63.71 | 65.67 | 65.56 | 60.81 | 65.03 | 73.62 | 70.74 | 66.24 |
| % Hydrogen | 8.88 | 9.20 | 9.66 | 9.08 | 9.39 | 7.13 | 10.65 | 8.22 |
| % Chlorine | 1.6 | 1.3 | 2.64 | 2.98 | 2.57 | — | — | — |

EXAMPLE 16

One of the features of the present invention is that new crosslinking reactions are possible with the products of the invention, incorporating the Class 2 components, compared to the conventional copolymers obtained only from Class 1 and Class 3 ingredients. In this example, there is demonstrated this unique behavior. The product from Example 6 was used to prepare a solution containing 2 grams of polymer in 100 ml. of acetone. When 1,6-hexanediamine was added, an insoluble crosslinked gel formed immediately. When the same experiment was carried out with a conventional isobutylene-ethyl acrylate copolymer, no crosslinking took place even on extended reaction periods.

EXAMPLES 17 and 18

Enhanced crosslinking rates are also evident in formulated stocks containing fillers. In Example 17, the product of Example 9 was formulated in the proportions:

| | |
|---|---|
| Rubber | 100 Parts |
| FEF Black | 60 |
| Stearic Acid | 1 |
| Magnesium Oxide | 1 |
| Hexamethylene-diamine carbamate | 1.5 |

This formulation crosslinks by the formation of the diamine in situ at the crosslinking temperature. A similar formulation was made in Example 18, except that a conventional ethyl acrylate, 2-chloroethyl vinyl ether, isobutylene copolymer was used. The results are shown in Table III, below.

TABLE III

| | Example 17 | Example 18 |
|---|---|---|
| Tensile, psi | 1180 | No |
| Elongation, % | 60 | Cure |

No cure was obtained with the conventional material at 320°F and ninety minutes while the product of the present invention had a tensile strength greater than 1000 psi.

Example 18 product was kept under cure conditions for an additional 30 minutes, and showed a tensile strength (psi) of 720 and 600% elongation.

What is claimed is:

1. A composition of matter comprising an interpolymer of from 20 to 60 mole % of one or more monoolefins of from 4 to 24 carbon atoms wherein said monoolefin is selected from the group consisting of branched 2-substituted-1-olefins and vinyl ethers, from 80 to 40 mole % of an acrylic acid ester where the ester moiety has from 1–20 carbon atoms, and from 0.05 to 35 mole % of a monomer selected from the group consisting of (a) diesters of fumaric acid, (b) diamides of fumaric acid, (c) derivatives of maleic acid selected from the group consisting of diesters, diamides, imides, and the anhydride, (d) $C_1$–$C_8$ alkyl substituted maleic acid derivatives selected from the group consisting of diesters, diamides, imides, and the anhydride, the interpolymer having an inherent viscosity greater than 0.3 when measured in benzene at 25°C.

2. The composition of claim 1, wherein the interpolymer consists of isobutylene and ethyl acrylate with from 0.1 to 15 mole % maleic anhydride.

3. The composition of claim 1, wherein, the interpolymer consists of isobutylene and ethyl acrylate with from 0.1 to 15 mole % citraconic anhydride.

4. The composition of claim 1 wherein the olefin is selected from the group consisting of isobutylene, 2-methyloctadecene-1, 2-methyl-butene-1, 2-methylpentene-1, and α-methyl styrene.

5. The composition of claim 1 wherein the vinyl ether is selected from the group consisting of methyl vinyl ether, ethyl vinyl ether, 2-chloroethyl vinyl ether and 2-alkyl ethyl vinyl ether.

6. A composition of matter comprising an interpolymer of from 20 to 60 mole % of at least one $C_2$–$C_{24}$ 1-olefin and a $C_3$–C vinyl ether, from 80 to 40 mole % of an acrylic acid ester where the ester moiety has from 1–20 carbon atoms, and from 0.05 to 35 mole % of a monomer selected from the group consisting of (a) diesters of fumaric acid, (b) diamides of fumaric acid, (c) derivatives of maleic acid selected from the group consisting of diesters, diamides, imides, and the anhydride, (d) $C_1$–$C_8$ alkyl substituted maleic acid derivatives selected from the group consisting of diesters, diamides, imides, and the anhydride, the interpolymer having an inherent viscosity greater than 0.3 when measured in benzene at 25°C.

7. A composition of matter comprising an interpolymer of from 20 to 60 mole % of one or more monoolefins of from 4 to 24 carbon atoms wherein said monoolefin is selected from the group consisting of branched-2-substituted-1-olefins and vinyl ethers, from 80 to 40 mole % of an acrylic acid ester where the ester moiety has from 1–20 carbon atoms, and from 0.05 to 35 mole % of a monomer selected from the group consisting of (a) diesters of fumaric acid, (b) diamides of fumaric acid, (c) derivatives of maleic acid selected from the group consisting of diesters, diamides, imides, and the anhydride, (d) $C_1$–$C_8$ alkyl substituted maleic acid derivatives selected from the group consisting of diesters, diamides, imides, and the anhydride, the interpolymer having an inherent viscosity greater than about 0.3 when measured in benzene at 25°C and wherein the interpolymer is comprised of segments of alternating monoolefin and acrylic acid ester monomer units of variable length interconnected by the fumarate or maleate derivative residues.

8. The composition of claim 6, wherein said vinyl ether is 2-chloroethyl vinyl ether.

* * * * *

UNITED STATES PATENT OFFICE
CERTIFICATE OF CORRECTION

Patent No. 3,926,925          Dated December 16, 1975

Inventor(s) Irving Kuntz

It is certified that error appears in the above-identified patent and that said Letters Patent are hereby corrected as shown below:

In Column 8, claim 6, line 51, after the phrase "1-olefin and a", change the phrase "$C_3$-Cvinyl" to --$C_3$-$C_{24}$ vinyl--.

Signed and Sealed this

Twenty-fifth Day of September 1979

[SEAL]

Attest:

LUTRELLE F. PARKER

*Attesting Officer*      *Acting Commissioner of Patents and Trademarks*